United States Patent
Marinier et al.

(10) Patent No.: US 8,433,355 B2
(45) Date of Patent: Apr. 30, 2013

(54) METHOD AND APPARATUS FOR GENERATING LOUD PACKETS TO ESTIMATE PATH LOSS

(75) Inventors: Paul Marinier, Brossard (CA); Vincent Roy, Montreal (CA); Marian Rudolf, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 981 days.

(21) Appl. No.: 11/403,501

(22) Filed: Apr. 13, 2006

(65) Prior Publication Data

US 2006/0270426 A1    Nov. 30, 2006

Related U.S. Application Data

(60) Provisional application No. 60/673,675, filed on Apr. 21, 2005.

(51) Int. Cl.
*H04B 7/00* (2006.01)
*H04B 1/00* (2006.01)
*H04Q 11/12* (2006.01)

(52) U.S. Cl.
USPC .......................... 455/522; 455/69; 455/127.1

(58) Field of Classification Search .................. 455/522, 455/69, 127.1, 67.11, 67.13; 370/335, 342
See application file for complete search history.

(56) References Cited

U.S. PATENT DOCUMENTS

| | | | |
|---|---|---|---|
| 6,978,151 B2 * | 12/2005 | Choi et al. | 455/522 |
| 7,016,684 B2 * | 3/2006 | Cave et al. | 455/450 |
| 7,454,205 B2 * | 11/2008 | Cave et al. | 455/434 |
| 2002/0109631 A1 | 8/2002 | Li et al. | |
| 2002/0168993 A1 | 11/2002 | Choi et al. | |

(Continued)

FOREIGN PATENT DOCUMENTS

| | | |
|---|---|---|
| RU | 2216865 | 11/2003 |
| WO | 03/077452 | 9/2003 |
| WO | 03/079611 | 9/2003 |
| WO | 2004/100450 | 11/2004 |

OTHER PUBLICATIONS

IEEE P802.11k/D1.0, Jul. 2004, Draft Amendment to Standard for Information Technology—Telecommunications and Information Exchange Between Systems—LAN/MAN Specific Requiremnets—Part 11: Wireless Medium Access Control (MAC) and Physical Layer (PHY) Specifications; Amendment 7: Radio Resource Measurement.

(Continued)

*Primary Examiner* — Tilahun B Gesesse
(74) *Attorney, Agent, or Firm* — Volpe and Koenig, P.C.

(57) ABSTRACT

In a wireless communication system, (e.g., a wireless local area network (WLAN)), including a plurality of wireless transmit/receive units (WTRUs) and a coordinating node, (e.g., an access point (AP)), path loss is estimated by transmitting a loud packet from a first one of the WTRUs to a second one of the WTRUs. The coordinating node transmits a loud packet generation request message. A first one of the WTRUs receives the loud packet generation request message and transmits at least one loud packet at a transmission power specified by the loud packet generation request message. Optionally, the first WTRU transmits a loud packet generation response message. A second one of the WTRUs receives the loud packet and determines a path loss between the first WTRU and the second WTRU by subtracting the signal strength of the loud packet from the determined transmission power of the loud packet.

45 Claims, 4 Drawing Sheets

U.S. PATENT DOCUMENTS

| | | | |
|---|---|---|---|
| 2003/0003863 | A1 | 1/2003 | Thielecke et al. |
| 2003/0176195 | A1 | 9/2003 | Dick et al. |
| 2003/0189906 | A1* | 10/2003 | Belcea .................... 370/318 |
| 2003/0216156 | A1 | 11/2003 | Chun |
| 2003/0231715 | A1 | 12/2003 | Shoemake et al. |
| 2004/0009785 | A1 | 1/2004 | Nelson, Jr. et al. |
| 2005/0058151 | A1* | 3/2005 | Yeh ........................ 370/445 |
| 2005/0152312 | A1* | 7/2005 | Marinier et al. ............. 370/332 |
| 2006/0063492 | A1* | 3/2006 | Iacono et al. ............. 455/67.11 |
| 2006/0215673 | A1* | 9/2006 | Olvera-Hernandez ........ 370/406 |

OTHER PUBLICATIONS

ANSI/IEEE Std 802.11 1999 Edition (R2003), Information Technology—Telecommunications and Information Exchange Between Systems—Local and Metropolitan Area Networks—Specific Requirements; Part 11: Wireless LAN Medium Access Control (MAC) and Physical Layer (PHY) Specifications; Reaffirmed Jun. 12, 2003.

IEEE P802.11k/D1.0, Jul. 2004, Draft Amendment to Standard for Information Technology—Telecommunications and Information Exchange Between Systems—LAN/MAN Specific Requirements—Part 11: Wireless Medium Access Control (MAC) and Physical Layer (PHY) Specifications; Amendment 7: Radio Resource Measurement.

IEEE P802.11k/D2.0, Feb. 2005, Draft Amendment to Standard for Information Technology—Telecommunications and Information Exchange Between Systems—LAN/MAN Specific Requirements—Part 11: Wireless Medium Access Control (MAC) and physical layer (PHY) specifications; Amendment 7: Radio Resource Measurement.

IEEE Std 802.11h—2003, IEEE Standard for Information Technology—Telecommunications and Information Exchange Between Systems—Local and Metropolitan Area Networks—Specific Requirements; Part 11: Wireless LAN Medium Access Control (MAC) and Physical Layer (PHY) Specifications; Amendment 5: Spectrum and Transmit Power Management Extensions in the 5 GHz Band in Europe, Oct. 14, 2003.

IEEE Wireless LAN Edition, A Compilation Based on IEEE Std 802.11—1999 (R2003) and its Amendments.

Qiao et al., "MiSer: An Optimal Low-Energy Transmission Strategy for IEEE 802.11a/h," Proceedings of the 9th annual international conference on Mobile computing and networking, pp. 161-175 (2003).

* cited by examiner

METHOD AND APPARATUS FOR GENERATING LOUD PACKETS TO ESTIMATE PATH LOSS

CROSS REFERENCE TO RELATED APPLICATION

This application claims the benefit of U.S. Provisional Application No. 60/673,675, filed on Apr. 21, 2005, which is incorporated herein by reference as if fully set forth.

FIELD OF INVENTION

The present invention is related to a wireless communication system, (e.g., a wireless local area network (WLAN)), comprising a plurality wireless transmit/receive units (WTRUs), (i.e., mobile stations). More particularly, the present invention is related to a method and apparatus for generating loud packets to estimate path losses between the WTRUs.

BACKGROUND

In a wireless system whose multiple-access scheme is based on carrier sense multiple access/collision avoidance (CSMA/CA) in accordance with IEEE 802 standards, (e.g., IEEE 802.11), WTRUs determine when to attempt receiving and transmitting packets based on the strength of received signals transmitted from neighboring WTRUs utilizing the same channel. By avoiding transmitting simultaneously, multiple WTRUs can avoid mutually interfering with each other while sharing the same channel.

A few key parameters, such as an energy detect threshold (EDT) and a defer threshold (DT), are typically used by a WTRU in determining when it is possible to transmit or receive a packet. The EDT represents the smallest received signal power for which reception of a packet will be attempted. The DT represents the smallest received signal power for which transmission of a packet by the WTRU will be deferred. The DT value may or may not be the same as the EDT value.

Although the basic concept of CSMA/CA is straightforward, there are certain situations where it results in undue reduction of capacity with respect to the maximum capacity that could be obtained. For instance, there are cases where two transmitters, (communicating with different receivers), could transmit simultaneously without interfering significantly with each other, but they do not do so because they hear each other above the values of their respective EDT and/or DT. This results in a waste of capacity which could be avoided if one of the following actions would take place:

a) The WTRUs reduce their transmission powers, so that the WTRUs cannot hear each other above the EDT, (and/or DT), but can still communicate at the optimum data rate to their respective counterparts;

b) the WTRUs raise their EDT, (and/or DT), so that the signals they receive from each other fall below this threshold; or c) a combination of a) and b).

The techniques by which a node or a system determines and sets the above-mentioned parameters, (transmission power, EDT, DT), will be hereinafter referred to as deferral management. The appropriate setting of these parameters would be facilitated if the WTRUs would know their path losses between each other, as well as the EDT or DT values used by other WTRUs. This knowledge would allow a WTRU, (or another node, such as an access point (AP) which controls some of the parameters of the WTRU), to predict if transmitting at a certain level would result in a received signal being above or below the EDT for a given neighboring WTRU. This knowledge could thereafter be used in algorithms aimed at optimizing capacity.

Obtaining path loss estimates may also be useful for positioning purposes. Using the knowledge of the set of path losses between pairs of WTRUs, as well as the knowledge of the position of several fixed WTRUs, (typically APs or mesh points (MPs in a mesh network), it is possible to estimate the location of a WTRU. This estimation could be performed by a node, (which may or may not be a WTRU), collecting the path loss estimates from one or several different WTRUs.

Therefore, a method by which WTRUs could reliably estimate their path loss to other WTRUs is desired.

Problem to be Solved

One straightforward manner in which a first WTRU could estimate the path loss between itself and a second WTRU that is neighboring the first WTRU would be for the first WTRU to subtract the received power it perceives from the transmission power used by the second WTRU. This assumes that the first WTRU is capable of determining the power at which the second WTRU transmits a signal that the first WTRU measured. The following are reasons why this is not possible in the current state of WLAN technology:

1) The setting of transmission power by APs, WTRUs, and MPs in state-of-the-art WLANs is proprietary and not communicated to other WTRUs. For example, the existing 802.11h/802.11k transmission power control (TPC) mechanism only imposes a maximum transmission power setting for the basic service set (BSS) that is not to be exceeded for regulatory purposes. It should be understood that any WTRU may vary transmission power below that maximum imposed limit, without communicating its internal proprietary decisions to other WTRUs, APs, or MPs.

2) The transmission power that each WTRU uses can vary on a packet basis. This implies that, in order for the first WTRU to estimate the path loss separating it from the second WTRU, the first WTRU would have to receive a packet from the second WTRU whereby the power at which the packet was transmitted would be indicated inside the packet. Using the same aforementioned example, the only signaling that allows such a packet to be transmitted is the 802.11h/802.11k TPC request/TPC report frame exchange mechanism which requires a dedicated two-way signaling exchange and cannot be set periodically. Moreover, the TPC requests/reports cannot be sent to WTRUs that are outside the BSS. In scenarios where WTRUs aim at adjusting their transmission power and DT/EDT parameters such that they would increase the capacity of the system without creating a hidden node inside and across BSSs in the system, the knowledge of the path loss between WTRUs from a different WTRU is often desired.

3) In many scenarios, the first WTRU may not hear the second WTRU because the second WTRU transmits at a lower power than its maximum power. This might be the case if the second WTRU uses battery management techniques or deferral management techniques. It should be noted that in scenarios where a WTRU aims at adjusting its deferral management parameters, it may be desirable to estimate the path loss of WTRUs even if it cannot hear them. There is currently no way for a WLAN node to dictate to another WLAN node to increase its transmission power or even to mandate the use of a specific transmission power other than specifying the maximum power that can be used. This also applies to the TPC request/TPC report mentioned above.

The above-mentioned issues regarding the mechanisms, (or in the lack of mechanisms), supporting path loss estimation between WTRUs pose several problems. In some cases, thee mechanisms force WTRUs to assume a value for the transmission power of the neighboring WTRU, which is not very accurate given the variations among different WTRU manufacturers and the possibility that a neighboring WTRU uses a transmission power lower than the maximum. In other cases, the mechanisms can completely prevent any path loss estimation between two WTRUs from being performed.

SUMMARY

The present invention is implemented in a wireless communication system, (e.g., a WLAN), including a plurality of WTRUs and a coordinating node, (e.g., an access point (AP)). A loud packet is transmitted from a first one of the WTRUs to a second one of the WTRUs. The coordinating node transmits a loud packet generation request message. A first one of the WTRUs receives the loud packet generation request message and transmits at least one loud packet at a transmission power specified by the loud packet generation request message. Optionally, the first WTRU transmits a loud packet generation response message. A second one of the WTRUs receives the loud packet and determines a path loss between the first WTRU and the second WTRU by subtracting the signal strength of the loud packet from the determined transmission power of the loud packet.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

Figure 1:
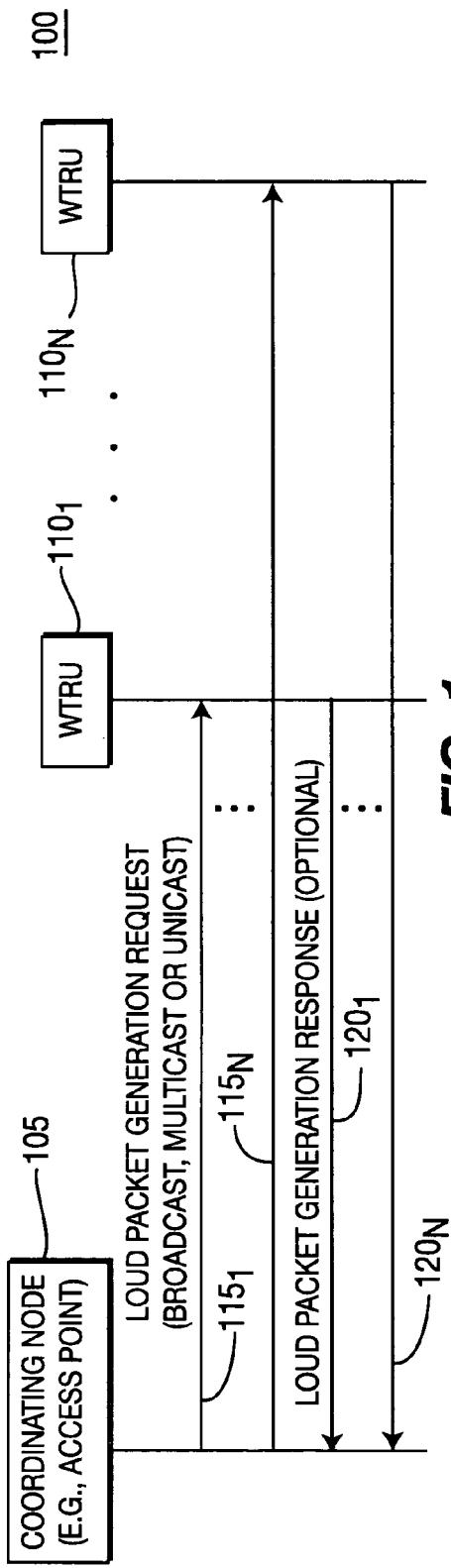
FIG. 1 is a flow signal diagram whereby loud packets are sent from a coordinating node to one or more WTRUs in a wireless communication system configured in accordance with the present invention.

When referred to hereafter, a WTRU includes but is not limited to a user equipment (UE), a mobile station, a fixed or mobile subscriber unit, a pager, or any other type of device capable of operating in a wireless environment. When referred to hereafter, an access point (AP) includes but is not limited to a Node-B, site controller, base station or any other type of interfacing device in a wireless communication environment.

In the following description, a WTRU may refer to any node in a wireless communication system, (e.g., an IEEE 802 WLAN system), a station, (AP or non-AP), in an independent basic service set (IBSS) or an infrastructure basic service set (BSS), or a mesh point, mesh AP or mesh portal in a mesh network.

The features of the present invention may be incorporated into an integrated circuit (IC) or be configured in a circuit comprising a multitude of interconnecting components.

Loud Packet Concept

In accordance with one embodiment of the present invention, WTRUs transmit, from time to time, packets, (hereinafter referred to as "loud packets"), at a high transmission power, whereby the value at which the packet is transmitted is known to the other WTRUs. These loud packets need not be directed to any specific WTRU or group of WTRUs, but can simply be broadcast to the set of WTRUs receiving on the same frequency channel. A neighboring WTRU desiring to calculate an estimate of its path loss to the WTRU transmitting the loud packet can do so by simply comparing the signal strength of the received loud packet to the indicated or known transmission power of the loud packet. For instance, the path loss estimate can be obtained by using the following equation:

$$\text{Path\_Loss (dB)} = \text{Transmission\_Power\_Of\_Loud\_Packet (dBm)} - \text{Received\_Signal\_Strength\_Of\_Loud\_Packet (dBm)} \quad \text{Equation (1)}$$

Preferably, the transmission power of the loud packet is indicated in the loud packet itself as an information field. Alternatively, this transmission power may also be periodically broadcast by the AP, indicated to each WTRU upon association to the AP, or communicated to a WTRU as part of other signaling exchanges. In this case, there is an information field present in the loud packet to indicate to receiving WTRUs that it is a loud packet and not a normal packet. Preferably, the transmission power of the loud packet should be equal to the maximum transmission power of the WTRU transmitting the loud packet. This ensures the widest possible area for successful reception of the loud packet and the most reliable estimation. However, this is not mandatory. Note that packets other than loud packets may be transmitted at a lower power in order to trade-off against other system parameters.

An identifier, (e.g., MAC address) of the WTRU transmitting the loud packet should also be included in an information field, so that receiving WTRUs know which WTRU the path loss estimate corresponds to.

Alternatively, loud packets can be implemented by any existing signaling frames sent with a transmission power selected by the transmitter and known by the receiver. For example, the transmission power may be known explicitly by the receiver from an attached or piggy-backed information element (IE) in the existing signaling frame. Alternatively, the transmission power for the loud packet can be known by the receiver as part of a prior signaling exchange with the sender of the loud packet.

In one advantageous realization, Beacon/Probe Response frames are used to take on the role of a loud packet. Their respective transmission powers could be either part of the beacon/probe request frame itself, or the agreed, pre-determined transmission power settings for these frames are communicated to the WTRUs by other means, such as neighbor information signaling.

Additional Information Reported in Loud Packets

Loud packets can be used as a flexible reporting mechanism to help receiving WTRUs optimize their parameters, (transmission power, EDT, DT). The following parameters may be reported, (in addition to the WTRU identifier and the transmission power of the loud packet or as stand-alone signaling if needed), by the transmitting WTRU (sender):

1) In an infrastructure BSS, the address or identifier of the AP associated to the WTRU (and/or the BSS, IBSS, or mesh identifier).

2) The power used to transmit packets other than loud packets.

3) A list of estimates of path loss perceived by the sender to other WTRUs.

4) A list of signal strength (or average thereof) of packets that the sender received from other WTRUs (one value for each other WTRU).

5) A list of total durations of packets that the sender received from other WTRUs within a specified amount of time (one value for each other WTRU).

6) The EDT used by the sender or known by the sender about other WTRUs.

7) The clear channel assessment (CCA) mode used by the sender or known by the sender about other WTRUs.

8) The DT used by the sender for transmitting a packet or known by the sender about other WTRUs.

Piggyback Option

In order to limit the amount of signaling bandwidth they use, a loud packet may be piggybacked to another type of packet (containing traffic, control, or management information). In this case, preferably the whole packet should be transmitted at the power of the loud packet.

Coordinated Management of Loud Packets Transmission

The transmission of loud packets need not be restricted to specific WTRUs. However, it may be desirable that this transmission be controlled to some extent by a coordinating node. Typically, the AP should play the role of the coordinating node in an infrastructure BSS. Controlling the generation of loud packets by a coordinating node has the advantage of guaranteeing minimum performance depending on the specific deferral management technique or positioning technique in use in the system.

FIG. 1 is a flow signal diagram whereby loud packets are sent from a coordinating node 105 to one or more WTRUs $110_1$-$110_N$ in a wireless communication system 100 configured in accordance with the present invention. Management of loud packets transmission can be achieved by signaling from the coordinating node 105, (e.g., an AP), to one or more WTRUs 110 that are to transmit a loud packet. Such signaling can be implemented by having the coordinating node 105 first transmitting a loud packet generation request message 115 to the WTRU(s) 110. The loud packet generation request message 115 may be a broadcast to all WTRUs 110 under the control of the coordinating node 105, (e.g., all WTRUs of the BSS), a multicast message, or a unicast message. The loud packet generation request message 115 may also be appended, for example, to one of the existing IEEE 802 signaling exchanges, such as to frames involved in the association/authentication or admission control procedures.

The information contained in the loud packet generation request message 115 may indicate one or more of the following:

1) The transmission power to use for the loud packets.

2) The information (among all possible fields listed above) to report in the loud packet.

3) The timing of the transmission of one or more loud packets. Several options are possible, including, but not limited to:

i) Periodically or quasi-periodically, with a specified period between successive transmissions of loud packets.

ii) A specified number of times, (e.g., one), within a specified time window.

iii) After a certain condition (trigger) has been met, such as:
a) detection of packets transmitted by a new WTRU; or
b) number of packets re-transmitted within a certain time period, above a specified threshold.

4) The number of received packets that are retransmitted packets within a certain time period, above a specified threshold.

5) An indication of whether the loud packets should be piggybacked (or not) to other packets.

6) Information about loud packet generation by other WTRUs, (i.e., all of the above for WTRUs other than the receiving WTRU).

The WTRU(s) receiving the loud packet generation request message 115 may optionally respond with a loud packet generation response message 120 as illustrated in FIG. 1. The loud packet generation response message may indicate the transmission power that the WTRU will use to transmit the loud packets, (if not specified in the request message, or if different than what was requested). This is useful if the transmission power of the loud packet is not indicated in the loud packet itself. In one embodiment, a loud packet generation request may be included in a field of a loud packet. Thus, the loud packet generation request message itself may be used by one WTRU to estimate the path loss to another WTRU.

Uncoordinated Management of Loud Packets Transmission

As an alternative to the coordinated management approach described above, WTRUs can autonomously determine when to transmit loud packets and what information to report in them. This behavior can be pre-agreed for WTRUs complying to a certain standard.

Another approach is to allow any WTRU, (not only the coordinating node), to send a loud packet generation request message to other WTRUs. Such a scheme might be appropriate in ad-hoc and mesh systems.

Support for Smart Antennas

The above description is suitable for WTRUs using simple antennas. In order to support WTRUs equipped with smart antennas (i.e., multi-beam or switched-beam antennas), it may be useful to include some additional information in the loud packet:

1) The antenna beam used by the WTRU to transmit loud packets, (this may be specified in the loud packet generation request message by the coordinating node). The path loss between a first WTRU and a second WTRU depends on which antenna beams are used. If the WTRU transmitting the loud packet may be using different antenna beams, the receiving WTRU should know which one of these beams has been used to transmit the loud packet, so that it knows to which antenna beam the path loss measurement should be associated.

2) The antenna beam used by the WTRU to transmit packets other than loud packets. Advanced deferral management algorithms need to know this information to properly set parameters (e.g. defer threshold) of the receiving WTRUs.

3) The antenna beam used by the WTRU to receive packets. This is the antenna beam used for reception by the WTRU that is transmitting the loud packet—not by the WTRU receiving the loud packet. Thus, the WTRU transmitting the loud packet notifies other WTRUs that whenever it receives a packet, it is using a certain antenna beam which may be different from the one currently used to transmit the loud packet. This information is useful to other WTRUs so that they know whether transmitting at a certain power would result in deferring (or not) at this WTRU.

Figure 2:
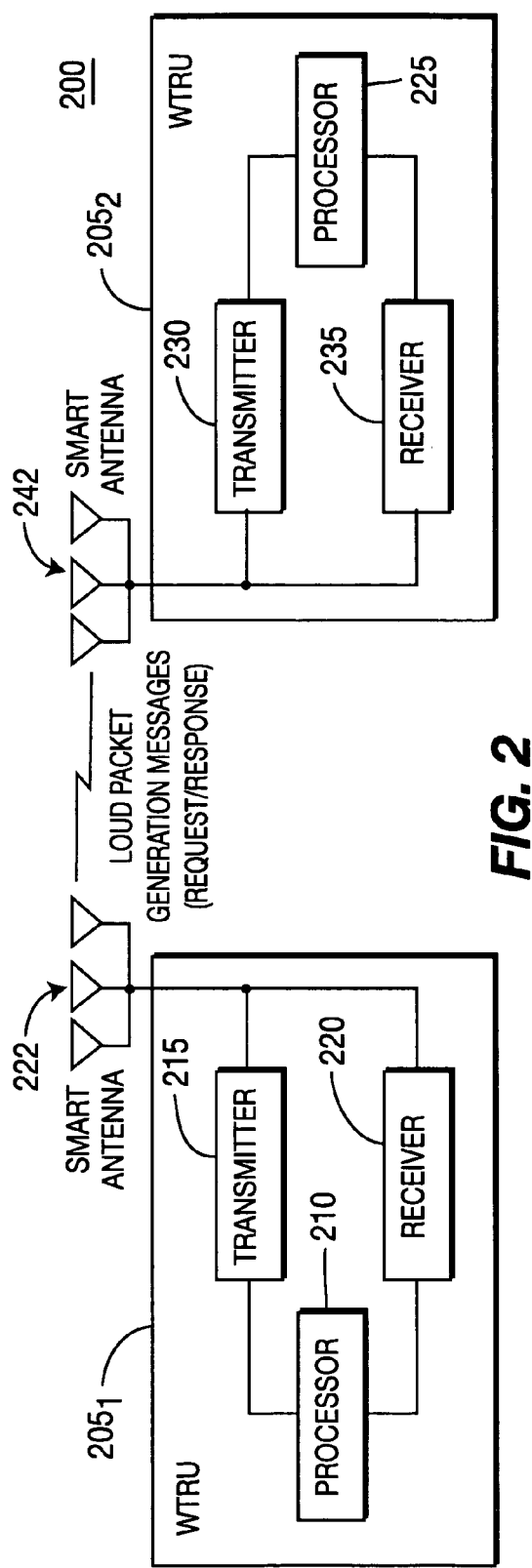
FIG. 2 is a block diagram of a wireless communication system including a plurality of WTRUs which use smart antennas to transmit and receive loud packets in accordance with the present invention.

FIG. 2 is a block diagram of a wireless communication system 200 including a plurality of WTRUs $205_1$, $205_2$ which use smart antennas 222, 242, respectively, to transmit and receive loud packets in accordance with the present invention. The WTRU $205_1$ includes a processor 210, a transmitter 215 and a receiver 220. The WTRU $205_2$ includes a processor 225, a transmitter 230 and a receiver 235.

The processors 210 and 225 of the WTRUs 205 are each configured to generate loud packets, loud packet generation request messages 115 and, optionally, loud packet generation response messages 120, which are transmitted via transmitters 215 and 230 and the smart antennas 222, 242, respectively. Furthermore, each of the receivers 220, 235 of the WTRUs 205 are configured to receive loud packets, loud packet generation request messages 115 and, optionally, loud packet generation response messages 120 via the smart antennas 222, 242, which are then processed by the processors 210, 225.

Using the loud packet information, the WTRU 205 receiving loud packets can determine distinct path loss estimates for each antenna beam of the smart antennas 222, 242 used by the WTRUs 205 to transmit and receive the loud packets. It is understood that "path loss" includes the gains due to the transmission/reception antennas, and different beams are used to receive and transmit different loud packets.

Figure 3:
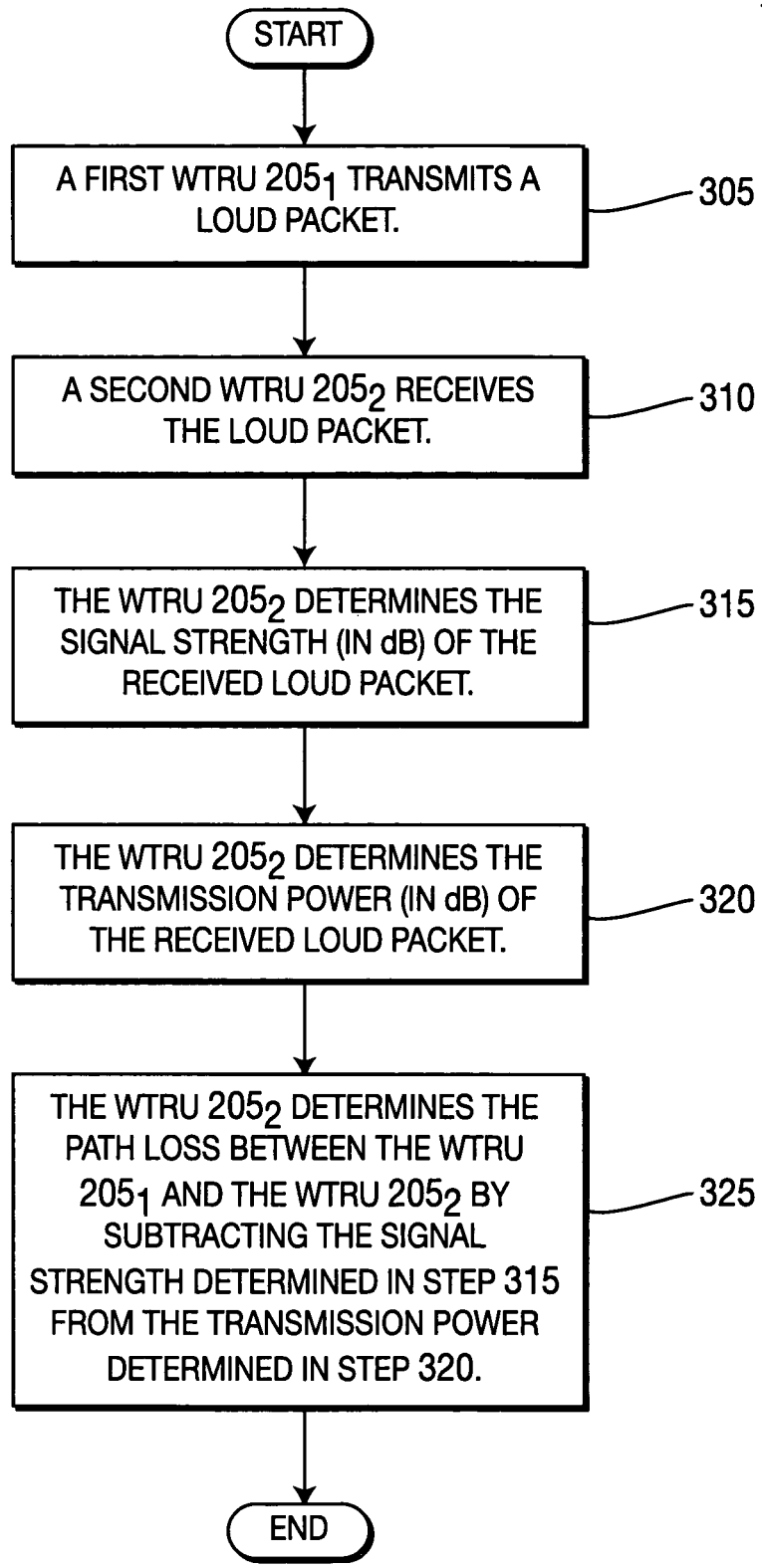
FIG. 3 is a flow diagram of a process of estimating path loss between two WTRUs in accordance with one embodiment of the present invention.

FIG. 3 is a flow diagram of a process 300 of estimating path loss between two WTRUs in accordance with one embodiment of the present invention. The process 300 is implemented in a wireless communication system, such as the system 200 of FIG. 2, including a plurality of WTRUs $205_1$ and $205_2$. A first WTRU $205_1$ transmits a loud packet (step 305). A second WTRU $205_2$ receives the loud packet (step 310), determines the signal strength (in dB) of the received loud packet (step 315), and determines the transmission power (in dB) of the received loud packet, (e.g., by obtaining the transmission power from the loud packet itself or from a loud packet generation request message that indicates what transmission power should be used), (step 320). The WTRU $205_2$ determines the path loss between the WTRU $205_1$ and the WTRU $205_2$ by subtracting the signal strength determined in step 315 from the transmission power determined in step 320 (step 325).

Figure 4:
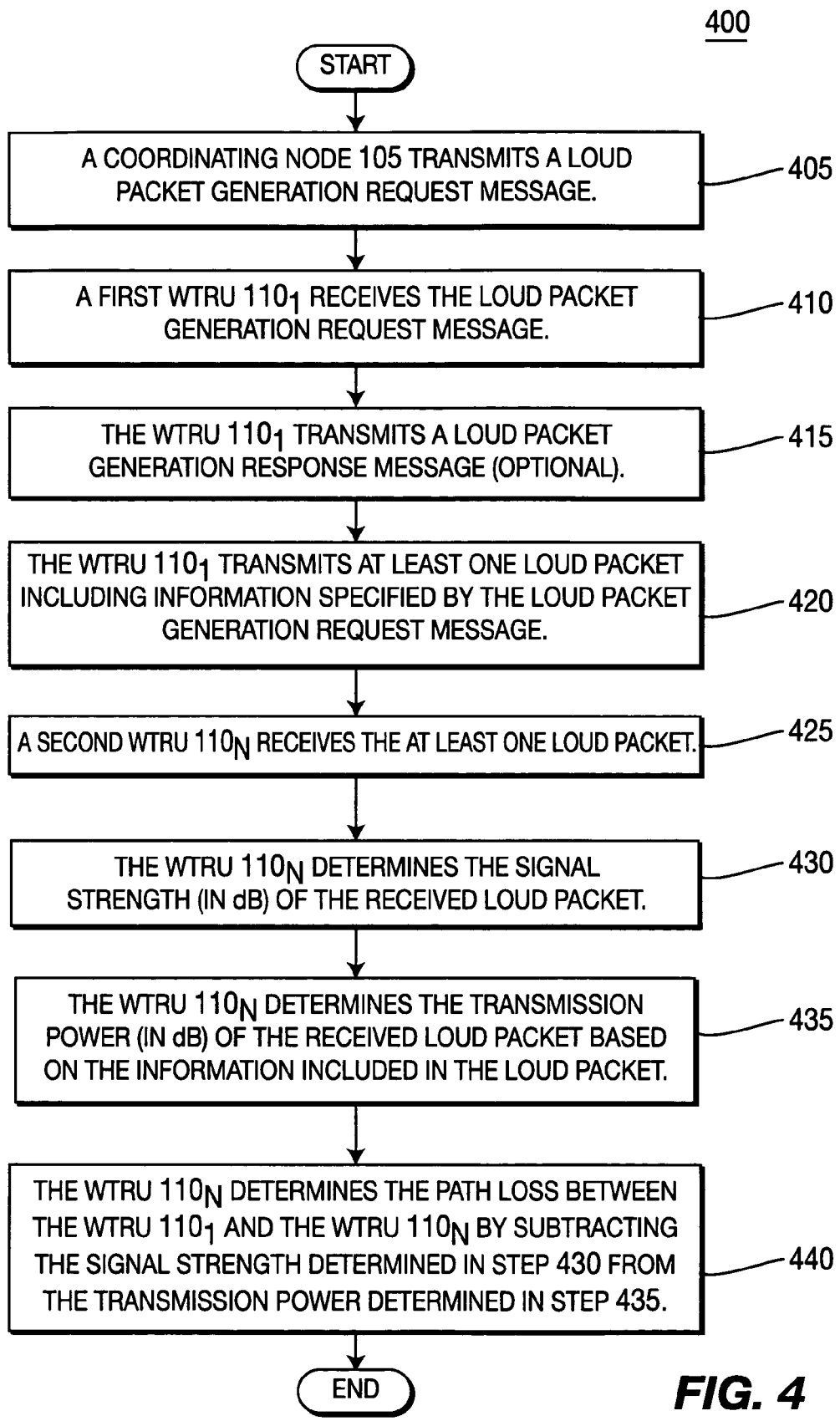
FIG. 4 is a flow diagram of a process of estimating path loss between two WTRUs based on information included in a loud packet generation request message transmitted by a coordinating node in accordance with another embodiment of the present invention.

FIG. 4 is a flow diagram of a process 400 of estimating path loss between two WTRUs based on information included in a loud packet generation request message transmitted by a coordinating node in accordance with another embodiment of the present invention. The process 400 is implemented in a wireless communication system, such as the system 100 of FIG. 1, including a coordinating node 105 and a plurality of WTRUs $110_1$-$110_N$. The coordinating node 105 transmits a loud packet generation request message (step 405). A first one of the WTRUs 110 receives the loud packet generation request message (step 410). In an optional step 415, the first WTRU responds to the loud packet generation request message by transmitting a loud packet generation response message. In step 420, the first WTRU transmits at least one loud packet including information specified by the loud packet generation request message. In step 425, a second one of the WTRUs 110 receives the at least one loud packet, determines the signal strength (in dB) of the received loud packet (step 430), and determines the transmission power (in dB) of the received loud packet based on the information included in the loud packet (step 435). In step 440, the second WTRU determines the path loss between the first WTRU and the second WTRU by subtracting the signal strength determined in step 430 from the transmission power determined in step 435.

Figure 5:
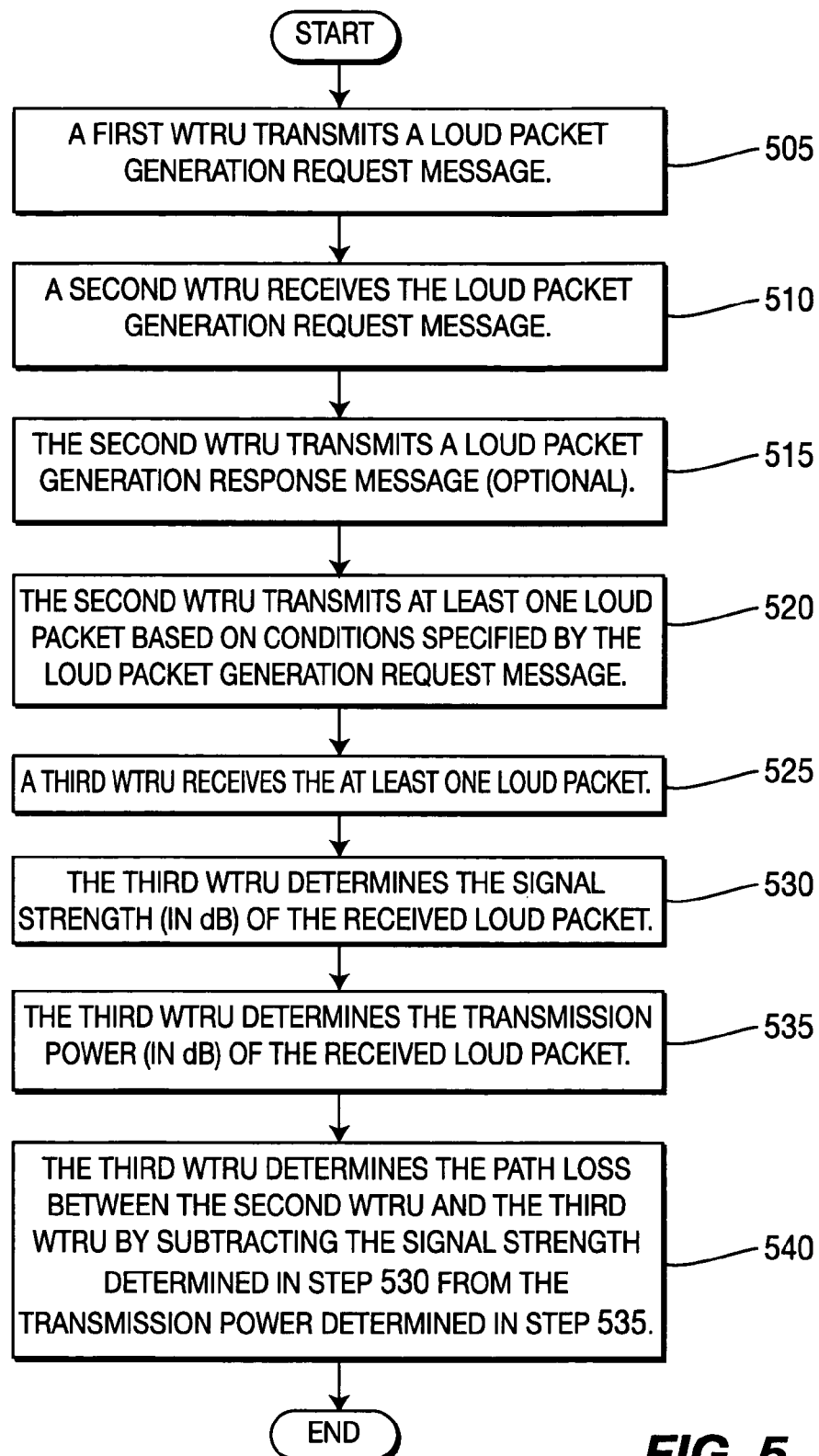
FIG. 5 is a flow diagram of a process of estimating path loss between two WTRUs based on conditions specified by a loud packet generation request message transmitted by a third WTRU in accordance with yet another embodiment of the present invention.

FIG. 5 is a flow diagram of a process 500 of estimating path loss between two WTRUs based on conditions specified by a loud packet generation request message transmitted by a third WTRU in accordance with yet another embodiment of the present invention. A first one of a plurality of WTRUs transmits a loud packet generation request message (step 505). A second one of the WTRUs receives the loud packet generation request message (step 510). In an optional step 515, the second WTRU responds to the loud packet generation request message by transmitting a loud packet generation response message. In step 520, the second WTRU transmits at least one loud packet based on conditions specified by the loud packet generation request message, (e.g., transmit at a particular transmission power, at a particular time, using a particular antenna beam of a smart antenna, or the like). In step 525, a third one of the WTRUs receives the at least one loud packet, determines the signal strength (in dB) of the received loud packet (step 530) and determines the transmission power (in dB) of the received loud packet (step 535). In step 540, the third WTRU determines a path loss between the second WTRU and the third WTRU by subtracting the signal strength determined in step 530 from the transmission power determined in step 535.

In conventional wireless communication systems, path loss estimation to neighboring WTRUs is subject to considerable uncertainty due to the absence of knowledge about the transmission power of the neighboring WTRUs. The only signaling that allows a WTRU to know which power a given packet has been transmitted with is the TCP request/report, which requires dedicated two-way signaling and cannot be set periodically. This issue is addressed in the present invention by having the transmission power of the WTRU indicated either within the loud packet itself or otherwise.

Furthermore, in conventional wireless communication systems, WTRUs transmitting at a power much lower than the maximum transmission level cannot be heard in a wide area by other WTRUs, which prevents any path loss estimation to be performed. It should be noted that in scenarios where a WTRU aims at adjusting its deferral parameters, it may be desirable for the WTRU to estimate the path loss that separates it from other neighboring WTRUs, even in the case where the WTRU cannot hear them at their current transmission power. The present invention solves this problem.

Additionally, in conventional wireless communication systems, a WTRU cannot accurately estimate the path loss separating it from neighboring WTRUs in the case where these WTRUs are not associated to the same BSS. The present invention provides a solution to this problem by controlling the generation of loud packets by the WTRUs.

Finally, there is no support for path loss estimation in conventional wireless communication systems with WTRUs equipped with smart antennas. The present invention supports inter-WTRU path loss estimation when WTRUs are equipped with smart antennas.

Although the features and elements of the present invention are described in the preferred embodiments in particular combinations, each feature or element can be used alone (without the other features and elements of the preferred embodiments) or in various combinations with or without other features and elements of the present invention.

What is claimed is:

1. A method for use in a wireless transmit/receive unit (WTRU) for enabling estimation of path loss in wireless communications, the method comprising:
   receiving a packet generation request from an access point (AP), wherein the packet generation request indicates a transmission power; and transmitting, using the transmission power indicated by the packet generation request, a packet in response to the packet generation request, wherein the packet is usable for calculating path loss, wherein the packet includes an information field that indicates that the packet is usable for calculating path loss, and wherein the packet includes a list of signal strengths of packets that the WTRU received from other WTRUs.

2. The method of claim 1, wherein the packet includes an information field, wherein the information field includes an identifier that identifies the WTRU transmitting the packet.

3. The method of claim 2, wherein the identifier is a medium access control (MAC) address.

4. The method of claim 1, wherein the packet comprises an Institute of Electrical and Electronics Engineers (IEEE) 802.11 signaling frame.

5. The method of claim 1, wherein transmitting the packet in response to the packet generation request includes piggybacking the packet to another type of packet.

6. A method for use in an access point (AP) for enabling estimation of path loss in wireless communications, the method comprising:
transmitting a packet generation request, wherein the packet generation request indicates a transmission power; and
receiving a response packet, wherein the response packet is usable for calculating path loss, wherein the response packet includes an information field that indicates that the response packet is usable for calculating path loss, and wherein the response packet includes a list of signal strengths of packets.

7. The method of claim 6, wherein the response packet includes an information field, wherein the information field includes an identifier that identifies the WTRU transmitting the packet.

8. The method of claim 7, wherein the identifier is a medium access control (MAC) address.

9. The method of claim 6, wherein the response packet comprises an Institute of Electrical and Electronics Engineers (IEEE) 802.11 signaling frame.

10. The method of claim 6, wherein transmitting the response packet includes piggybacking the response packet to another type of packet.

11. The method of claim 1 wherein the packet generation request is a broadcast message, unicast message, or multicast message, or is appended to an Institute of Electrical and Electronics Engineers (IEEE) 802.11 signaling exchange.

12. The method of claim 1 further comprising:
transmitting a packet generation response, wherein the packet generation response indicates a transmission power that the WTRU is using to transmit the packet.

13. The method of claim 1, wherein the packet generation request includes at least one of the following: information that the WTRU should report in the packet, timing of the transmission of one or more packets, a number of retransmitted packets received within a certain time period above a specified threshold, an indication of whether a response packet should be piggybacked to another packet, or information about packet generation by other WTRUs.

14. The method of claim 1, wherein the packet transmitted in response to the packet generation request includes at least one of the following: an address or identifier of an AP associated with the WTRU, a power value used to transmit packets other than loud packets, a list of estimates of path loss or a list of known defer thresholds for transmitting a packet of units in the network.

15. The method of claim 1, wherein the packet generation request includes a transmission power value.

16. The method of claim 15, wherein transmitting the packet in response to the packet generation request includes transmitting at the transmission power indicated by the packet generation request.

17. The method of claim 15, further comprising: transmitting a packet generation response, wherein the packet generation response indicates a transmission power that the WTRU is using to transmit the packet, on a condition that the WTRU uses a different transmission power from the transmission power value included in the packet generation request.

18. The method of claim 6, further comprising: receiving a packet generation response, wherein the packet generation response indicates the transmission power at which the response packet is transmitted.

19. The method of claim 6, wherein the packet generation request includes at least one of the following: information that the WTRU should report in the packet, timing of the transmission of one or more packets, a number of retransmitted packets received within a certain time period above a specified threshold, an indication of whether the packets should be piggybacked to other packets, or information about packet generation by other WTRUs.

20. The method of claim 6, wherein the response packet includes at least one of the following: an address or identifier of an AP associated with the WTRU, a power value used to transmit packets other than loud packets, a list of estimates of path loss or a list of known defer thresholds for transmitting a packet of units in the network.

21. The method of claim 6, wherein the packet generation request includes a transmission power value.

22. The method of claim 21, further comprising:
receiving a packet generation response, wherein the packet generation response indicates the transmission power at which the response packet is transmitted, on a condition that the transmission power is different from the transmission power value in the packet generation request.

23. A wireless transmit/receive unit (WTRU) comprising:
a receiver configured to receive a packet generation request, wherein the packet generation request indicates a transmission power; and
a transmitter configured to transmit a packet in response to the packet generation request, wherein the packet is transmitted using the power indicated by the packet generation request, wherein the packet is usable for calculating path loss, wherein the packet includes an information field that indicates that the packet is usable for calculating path loss, and wherein the packet includes a list of signal strengths of packets that the WTRU received from other WTRUs.

24. The WTRU of claim 23, wherein the transmitter is configured to transmit a response packet that includes an information field, wherein the information field includes an identifier that identifies the WTRU transmitting the packet.

25. The WTRU of claim 24, wherein the identifier is a medium access control (MAC) address.

26. The WTRU of claim 23, wherein the transmitter is configured to transmit a response packet that comprises an Institute of Electrical and Electronics Engineers (IEEE) 802.11 signaling frame.

27. The WTRU of claim 23, wherein the transmitter is configured to transmit the response packet piggybacked to another type of packet.

28. The WTRU of claim 23, wherein the receiver is configured to receive the packet generation request from an access point (AP).

29. The WTRU of claim 23, wherein the receiver is configured to receive a packet generation request that is a broadcast message, unicast message, or multicast message, or appended to an Institute of Electrical and Electronics Engineers (IEEE) 802.11 signaling exchange.

30. The WTRU of claim 23, wherein the transmitter is configured to transmit a packet generation response, wherein the packet generation response indicates the transmission power that the transmitter will use to transmit the packet.

31. The WTRU of claim 23, wherein the receiver is configured to receive a packet generation request that includes at least one of the following: information that the transmitter should report in the packet, timing of the transmission of one or more packets, a number of retransmitted packets received within a certain time period above a specified threshold, an indication of whether response packets should be piggybacked to other packets, or information about packet generation by other WTRUs.

32. The WTRU of claim 23, wherein the receiver is configured to receive a packet generation request that includes a transmission power value.

33. The WTRU of claim 32, wherein the transmitter is configured to transmit a response packet at the transmission power indicated by the packet generation request.

34. The WTRU of claim 32, wherein the transmitter is configured to transmit a packet generation response that includes the transmission power value it uses to transmit a response packet, on a condition that the transmitter does not transmit the response packet at the transmission power indicated by the packet generation request.

35. A wireless transmit/receive unit (WTRU) comprising:
a transmitter configured to transmit a packet generation request, wherein the packet generation request indicates a transmission power; and
a receiver configured to receive a response packet, wherein the response packet is usable for calculating path loss, wherein the response packet includes an information field that indicates that the response packet is usable for calculating path loss, and wherein the response packet includes a list of signal strengths of packets.

36. The WTRU of claim 35, wherein the receiver is configured to receive a response packet that includes an information field, wherein the information field indicates the transmission power used to transmit the response packet.

37. The WTRU of claim 36, wherein the identifier is a medium access control (MAC) address.

38. The WTRU of claim 35, wherein the receiver is configured to receive a response packet that comprises an Institute of Electrical and Electronics Engineers (IEEE) 802.11 signaling frame.

39. The WTRU of claim 35, wherein the receiver is configured to receive the response packet piggybacked to another type of packet.

40. The WTRU of claim 35, wherein the transmitter is configured to transmit the packet generation request as a broadcast message, unicast message, or multicast message, or appended to an Institute of Electrical and Electronics Engineers (IEEE) 802.11 signaling exchange.

41. The WTRU of claim 35, wherein the receiver is configured to receive a packet generation response, wherein the packet generation response indicates the transmission power of the response packet.

42. The WTRU of claim 35, wherein the transmitter is configured to transmit a packet generation request that includes at least one of the following: information that the receiving WTRU should report in the packet, timing of the transmission of one or more packets, a number of retransmitted packets received within a certain time period above a specified threshold, an indication of whether response packets should be piggybacked to other packets; or information about packet generation by other WTRUs.

43. The WTRU of claim 35, wherein the transmitter is configured to transmit a packet generation request that includes a transmission power value.

44. The WTRU of claim 43, wherein the receiver is configured to receive a packet in response to the packet generation request that is transmitted at the transmission power indicated by the packet generation request.

45. The WTRU of claim 43, wherein the receiver is configured to receive a packet generation response that includes the transmission power value of the response packet, on a condition that the response packet does not have the transmission power indicated by the packet generation request.

* * * * *